United States Patent [19]

Williamson et al.

[11] Patent Number: 5,257,752
[45] Date of Patent: Nov. 2, 1993

[54] VIDEO CASSETTE EXPANDABLE FROM A CONDITION OF REDUCED THICKNESS TO AN OPERATING THICKNESS

[76] Inventors: Kyle L. Williamson, 13112 - 61st Avenue; Kevin M. Williamson, 7041 Malvern Pl., both of Surrey, B.C., Canada, V3W 8C2

[21] Appl. No.: 710,741

[22] Filed: Jun. 5, 1991

[51] Int. Cl.⁵ .......................................... G11B 23/087
[52] U.S. Cl. ..................................................... 242/199
[58] Field of Search ............... 242/197, 198, 199, 200; 360/132; 206/387, 389

[56] References Cited

U.S. PATENT DOCUMENTS

| | | | |
|---|---|---|---|
| 4,438,846 | 3/1984 | Stylianou | 206/387 |
| 4,516,181 | 5/1985 | Shirako | 360/132 |
| 4,674,703 | 6/1987 | Falk | 242/192 X |
| 4,706,148 | 11/1987 | Komiyama et al. | 360/132 |
| 4,742,416 | 5/1988 | Oishi et al. | 360/132 |
| 4,882,645 | 11/1989 | Bordignon | 360/132 |
| 4,883,176 | 11/1989 | Hart et al. | 206/389 X |
| 4,969,612 | 11/1990 | Thomas | 242/199 |

FOREIGN PATENT DOCUMENTS

| | | | |
|---|---|---|---|
| 1148443 | 5/1963 | Fed. Rep. of Germany | 242/199 |
| 2129119 | 12/1971 | Fed. Rep. of Germany | 206/387 |
| 2837609 | 3/1980 | Fed. Rep. of Germany | 206/387 |
| 2017644 | 10/1979 | United Kingdom | 206/387 |
| 2210352 | 6/1989 | United Kingdom | 360/132 |

Primary Examiner—Daniel P. Stodola
Assistant Examiner—John P. Darling
Attorney, Agent, or Firm—Townsend and Townsend Khourie and Crew

[57] ABSTRACT

A video cassette which is collapsible to a reduced thickness for mailing purposes. The upper surface moves from a lower mailing position in which it bears tightly against the tape spools to an upper operating position. Preferably it is provided with pivoting ends which rotate to the upper position to provide a rigid frame for the operating cassette.

15 Claims, 14 Drawing Sheets

VIDEO CASSETTE EXPANDABLE FROM A CONDITION OF REDUCED THICKNESS TO AN OPERATING THICKNESS

FIELD OF THE INVENTION

The invention relates to video cassettes and more particularly to a videocassette which is collapsible for particular utility in mailing through the postal services, whether in an envelope or as a magazine insert.

BACKGROUND OF THE INVENTION

During the 1980's, the video cassette recorder ("VCR") rapidly became a standard component of the entertainment centres of most North American, European and Japanese households as its price dropped dramatically. The majority of VCR's in use are of the VHS format. Due to the prevalence of VCR's, it has become commonplace for individuals to send greetings, messages and the like through the mails in the form of pre-recorded video cassettes. Greeting card manufacturers have noted this trend and have begun to offer pre-recorded video Christmas greetings and the like in the form of pre-recorded video cassettes. Similarly direct mail advertisers are increasingly using pre-recorded video cassettes as a medium for direct mail advertising.

The use of video cassettes as a direct mail advertising medium is very expensive, not only because of the manufacturing costs of the video cassettes, but primarily because of mailing costs since standard VHS cassettes are too heavy and large to qualify for regular envelope or bulk postal rates. A standard VHS video cassette is one-inch thick and weighs 6.5 oz. without tape, and 8.3 oz. with tape. The VHS tape itself is only ½-inch wide, however the standard recorder requires the one-inch thick cassette to operate. In Canada, the postal rate to mail a standard VHS cassette is currently $3.90, compared to the bulk rate for standard business mail of $0.24. In the United States, the bulk rate is 16 cents per piece, while items over 4 oz., such as standard VHS cassettes, go to 60 cents. There is a further problem with standard VHS cassettes as a direct mailing medium on that they do not fit readily through many mail slots.

While cardboard, hardboard or wooden video cassettes have been attempted to reduce the weight of the cassettes and thus the postal costs, such cassettes are easily crushed in the mail and are not reliable to operate once received by the user. They tend to cause dust or cardboard particles to contaminate the VCR. Consequently advertisers are reluctant to commit their reputation to such products. Further such cardboard cassettes are the same dimensions as standard VHS cassettes and so do not benefit from the reduced postal rates in countries such as Canada which base rates on dimensions, and have the same problems fitting through mail slots.

There is therefore a need for a reduced thickness and weight mailing video cassette which can operate in standard VHS VCR's.

SUMMARY OF THE INVENTION

The invention provides a video cassette having upper and lower surfaces enclosing two tape spools in which the upper surface is movable between a lower position adjacent said spools for transport and an upper operating position. According to one aspect of the invention, the upper surface is mounted on a movable frame.

BRIEF DESCRIPTION OF THE DRAWINGS

In drawings which illustrate a preferred embodiment of the invention.

DETAILED DESCRIPTION OF THE PREFERRED EMBODIMENT

With reference to the FIGS. 1 through 7, a first embodiment of the collapsible video cassette of the invention is designated generally as 10. A plastic housing 12 has a lower panel 14, front wall 16, rear wall 18 and side walls 20. Side wings 22 and 23 pivot on hinges 24 from the lowered position shown in FIG. 2 to the raised position shown in FIG. 1. Hinges 24 may be formed integrally as a unitary part of the plastic housing, by providing a flexible area of the plastic. Wings 22 and 23 have side walls 26 and 27 and top panels 28 and 29.

Cut-outs 30 are provided in walls and panels 26 through 29 to reduce the weight of the cassette. Cylindrical posts 32 are provided on wings 22 and 23. They have pin extensions 33 which fit into holes 34 of posts 35 to form a full height post when the wings are pivoted to the raised position to align and secure the wings. Slots 36, 38, 40 and 42 are also provided to engage clips 37, 39, 41 and 43 respectively to secure the wings in the raised position.

Figure 1:
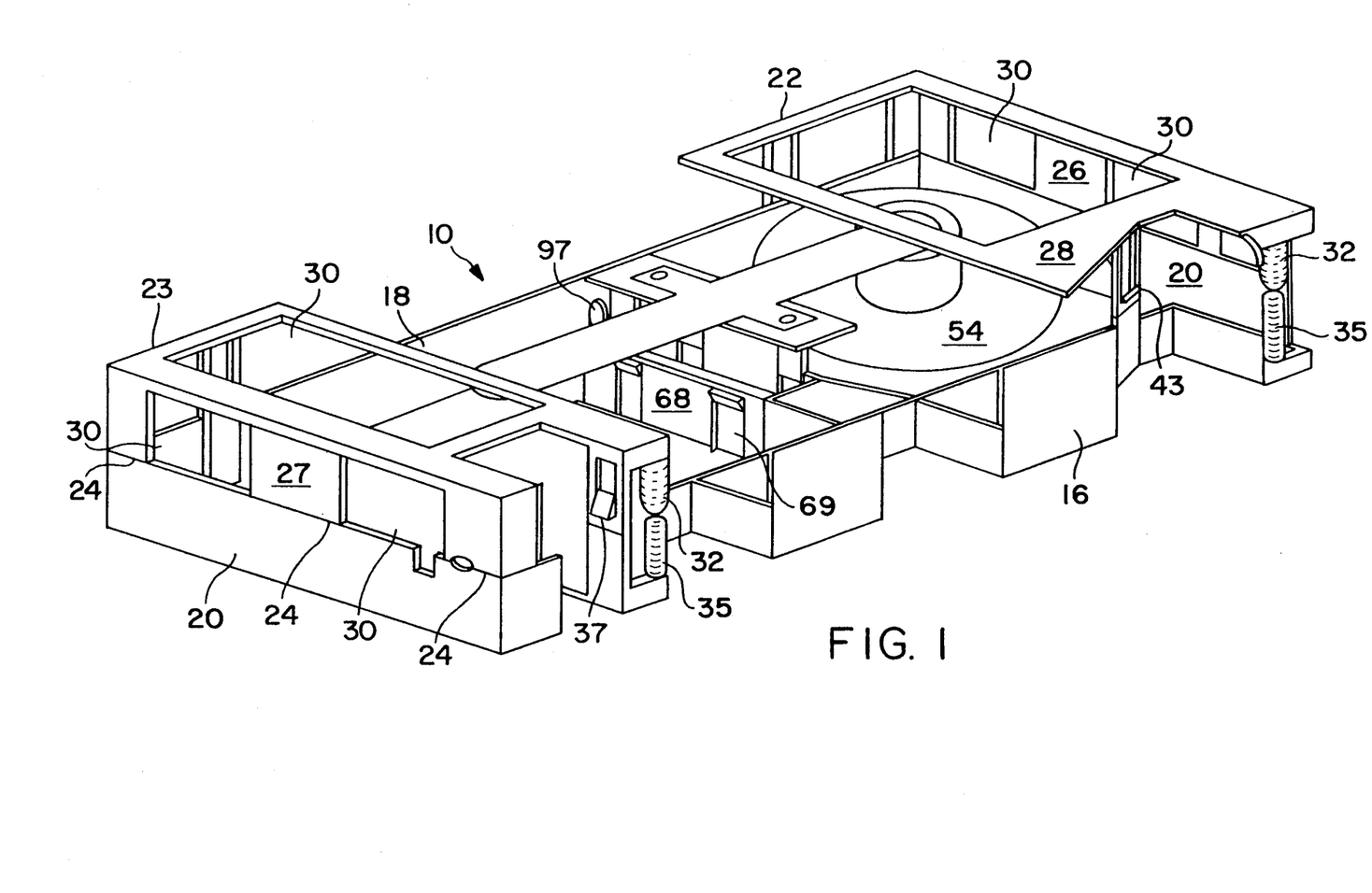
FIG. 1 is a perspective view of a first embodiment of the video cassette of the invention, in operating condition, with one tape spool and the top cover removed for illustrative purposes.
Figure 2:
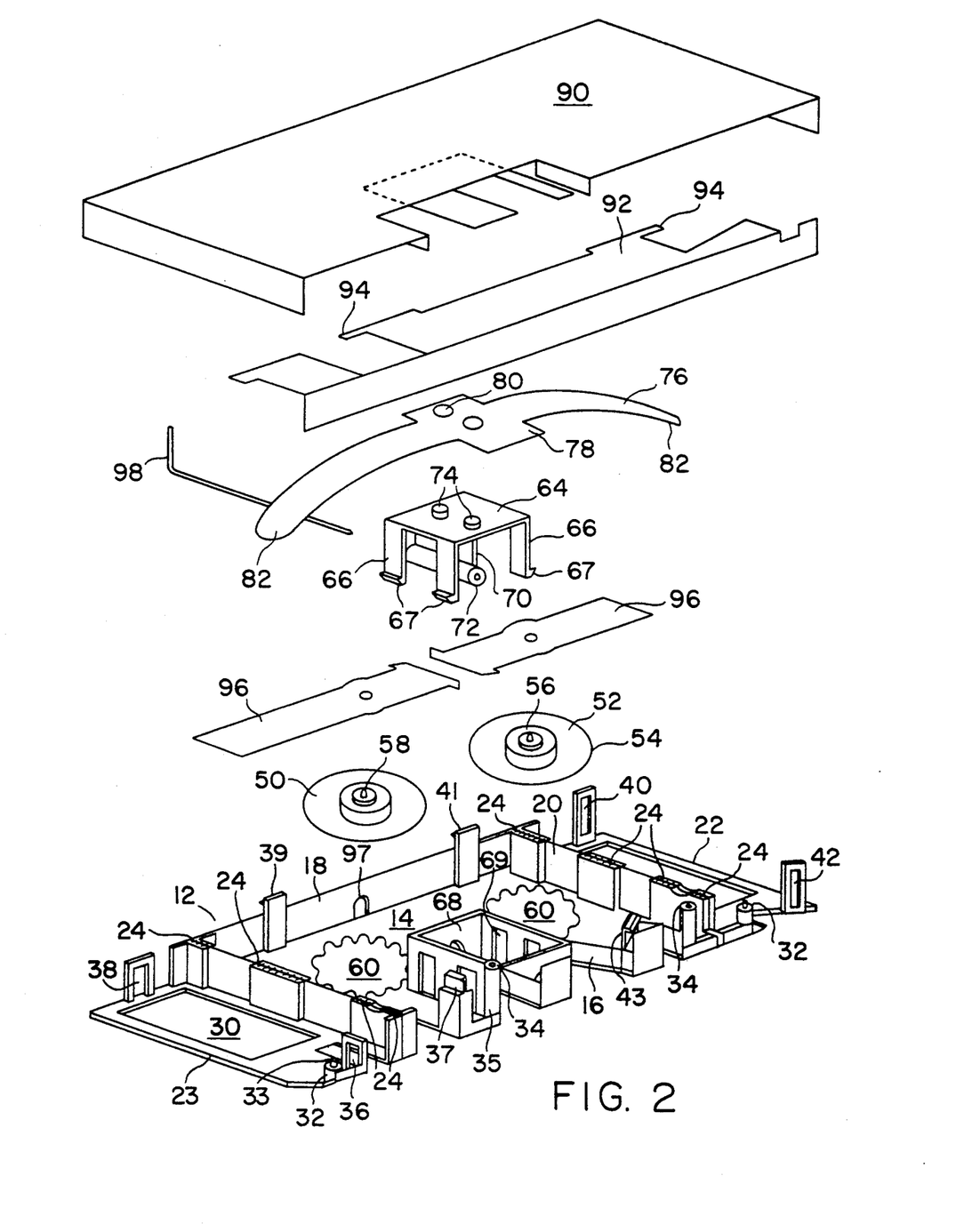
FIG. 2 is a perspective view of the video cassette of the invention, in exploded view.

As illustrated in FIG. 1, posts 32 are somewhat larger in diameter than posts 35, with rounded ends on both posts 32 and 35. This ensures that the videotape does not contact a seam between the posts which would cause a mark on the tape. This also causes the bottom of the tape to angle inwardly, and as the tape winds it tends to move downwardly, hugging the bottom flange and ensuring a smooth wind across the top of the tape which assists further in providing a slim profile for the cassette.

Tape spools 50 and 52 are of a size to receive standard VHS ½-inch tape. Each has a lower flange 54 and a central post 56. The underside of each post 56 is configured to receive the tape driving mechanism of the standard VHS recorder through apertures 60 in the lower panel 14 of housing 12. Each post 56 has a central axis 58.

Central frame 64 has four legs 66, each provided with a clip 67, which slide in slots 69 of guide 68. Secured to the underside of frame 64 by flange 70 is a cylindrical tube 72. Two knobs 74 are provided on the upper surface of frame 64. A metal leaf spring 76 has a central rectangular area which is secured to the upper surface of frame 64, with holes 80 inserted over knobs 74 for alignment purposes. Knobs 74 are melt tabs which are melted into a mushroom shape to secure the spring in place, or the spring may be secured to frame 64 by glue. Spring 76 has two arms 82, the ends of which bear against the central axis 58 of the tape spools 50, 52. A top cover 90, typically of cardboard, is secured to the upper surface of area 78 and pivotally attached to the top cover 90 is a front door panel 92, held in place by hinge elements 94. Door panel 92 protects the tape when the cassette is ready to be loaded into a VCR, and pivots upwardly in the usual fashion to expose the tape when the cassette is loaded in the VCR.

Figure 7:
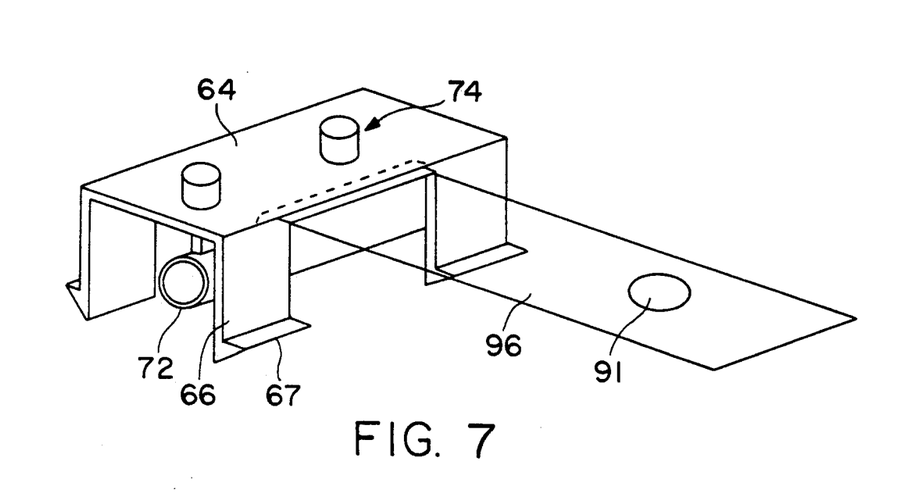
FIG. 7 is a detailed perspective view of the pin-holding chassis of the invention.
Figure 8:
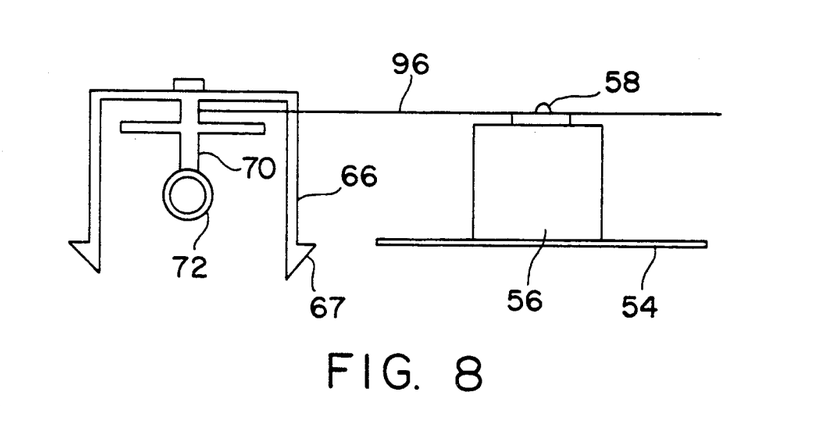
FIG. 8 is a front view of the pin-holding chassis shown in FIG. 7.
Figure 9:
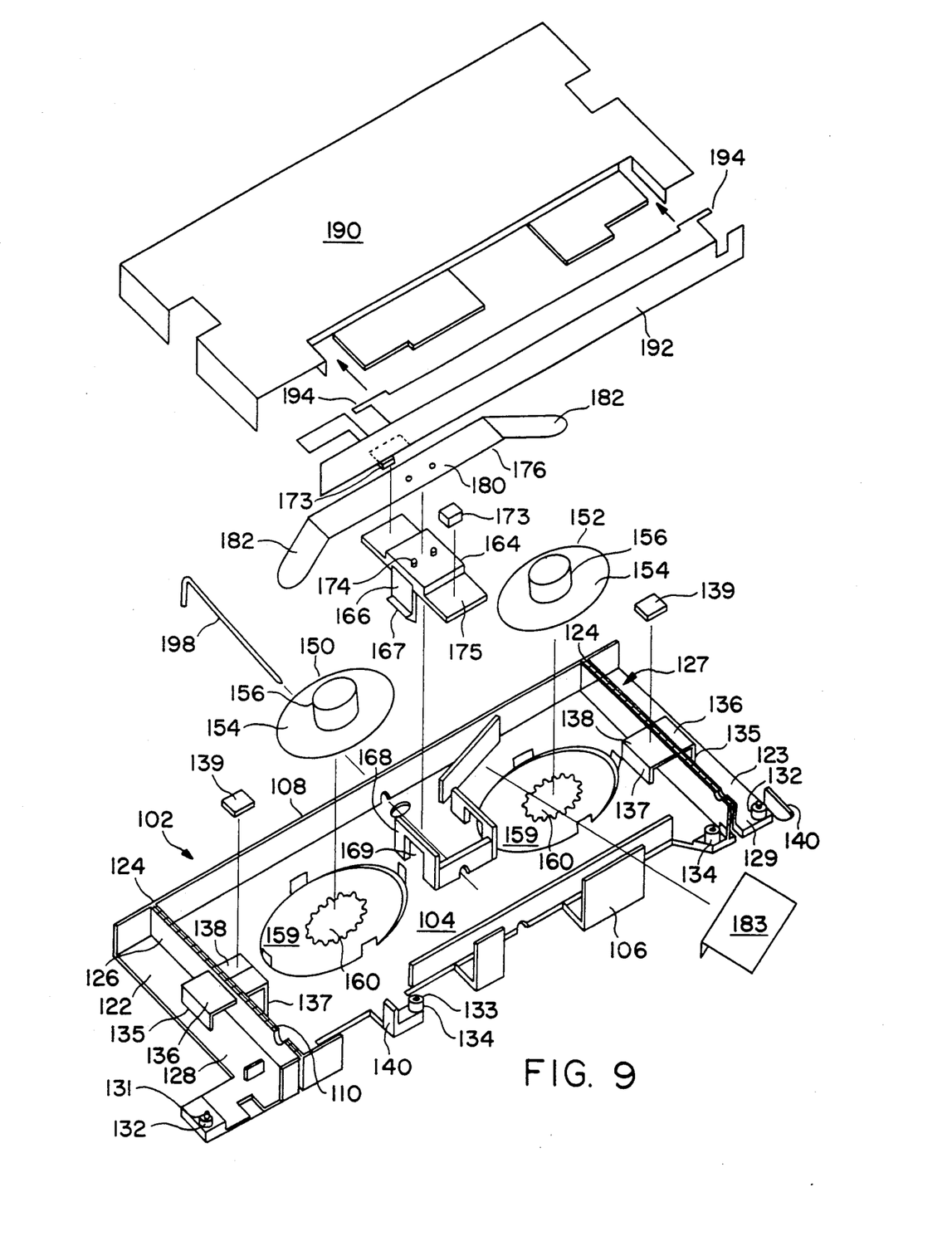
FIG. 9 is an exploded perspective view of a second embodiment of the video cassette of the invention.

As shown in FIGS. 7 and 8, strips of wax-coated paper 96 are clipped at one end to frame 64 between legs 66. The other end has hole 91 which sits over axis 58 of spools 50, 52. The purpose of strips 96 is to smooth the wind of the tape as it winds beneath it. It reduces the friction between spring 76 and posts 56 when the spools are rotating.

Figure 3:
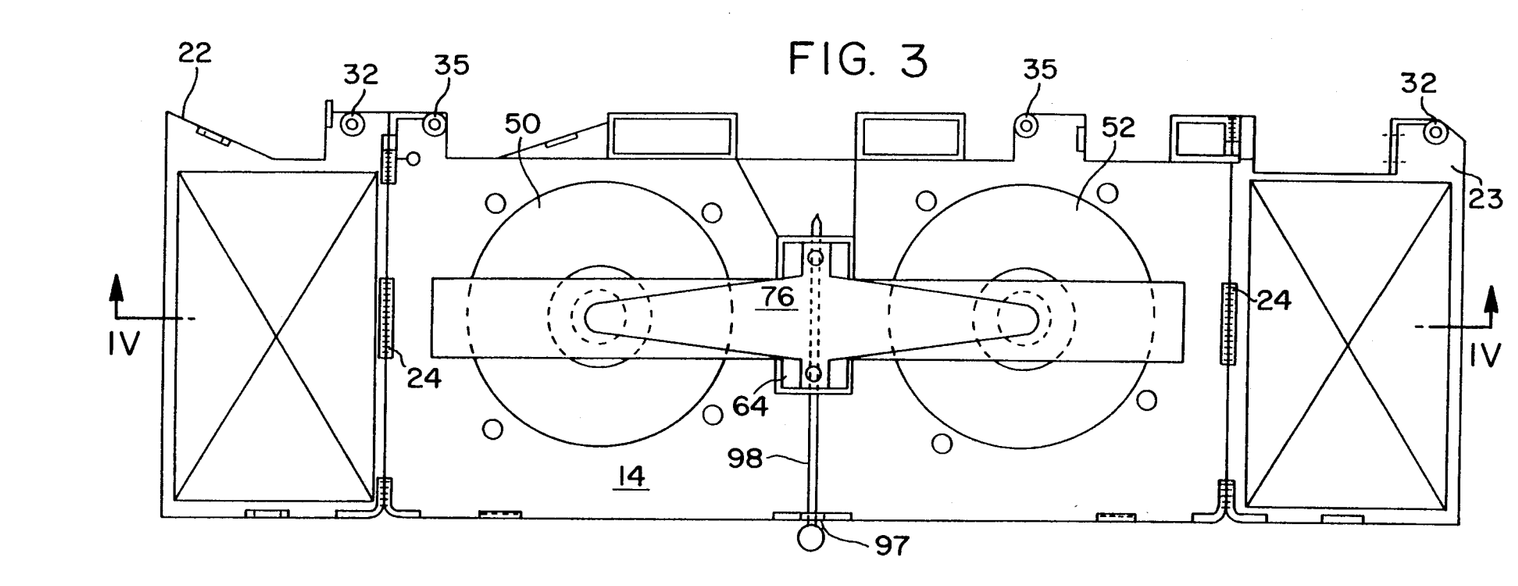
FIG. 3 is a plan view of the video cassette of the invention, with retaining pin in place.
Figure 4:
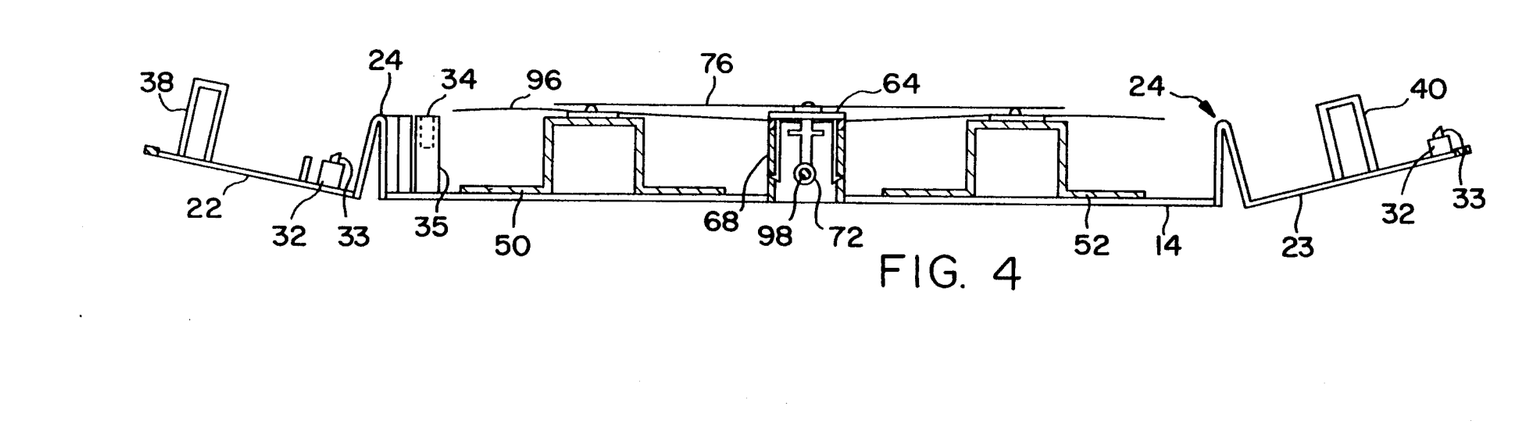
FIG. 4 is a cross-sectional view of the video cassette of the invention shown in FIG. 3, taken along lines IV—IV of FIG. 3.
Figure 5:
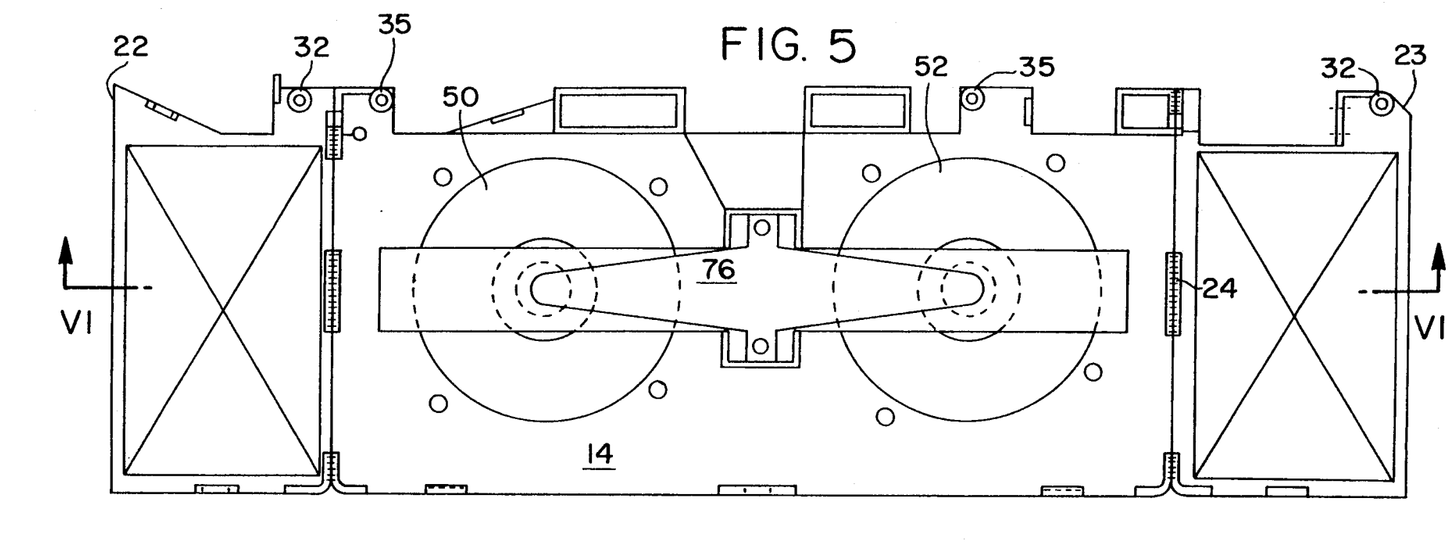
FIG. 5 is a plan view of the video cassette of the invention, with retaining pin removed.
Figure 6:
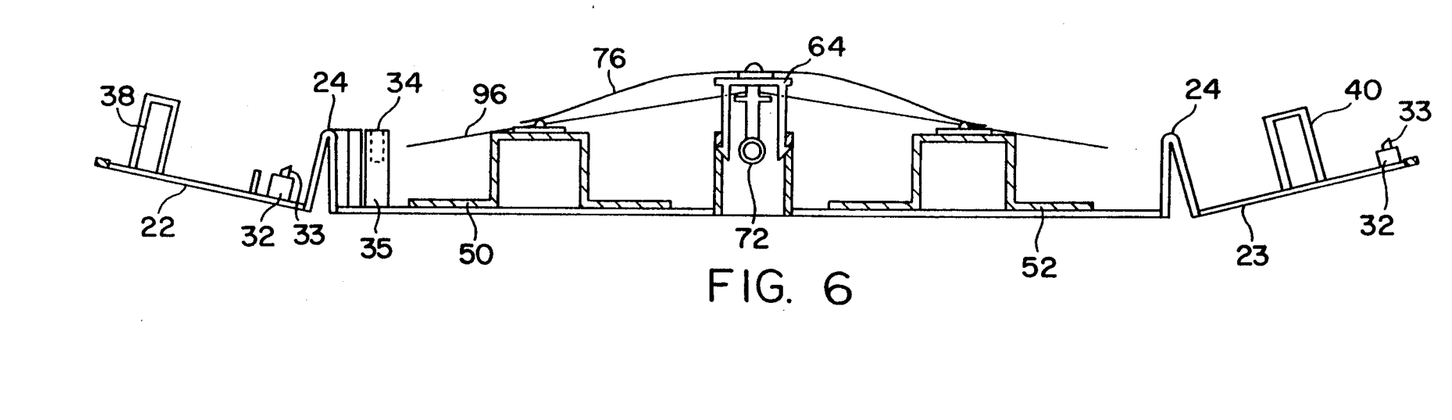
FIG. 6 is a cross-sectional view of the video cassette of the invention shown in FIG. 5, taken along lines VI—VI of FIG. 5.

The cassette of the invention is shown in FIG. 3 in orientation for mailing. Wings 22 and 23 are folded outwardly and downwardly to reduce the thickness of the cassette (they are shown in FIG. 4 in a position which is not completely folded down for mailing). Frame 64 is moved downwardly, and attached spring 76 placed under tension, until hole 97 in rear wall 18 of housing 12 is aligned with tube 72. Pin 98 is then inserted through hole 97 and tube 72 to secure the frame 64 in the lowered position for mailing. Once the cassette has been received, wings 22 and 23 are pivoted to the upper position, secured by clips 37, 39, 41 and 43, and the pin 98 is removed as shown in FIGS. 5 and 6. Spring 76 causes frame 64 to move upwardly to its upper position shown in FIG. 6. Cover 90 rides upwardly on spring 76 and sits under wings 22 and 23 when these are pivoted to the upper position. The reels are then free to rotate. In this way the cassette can now function at its full 1-inch thickness in a standard VHS VCR while its mailing thickness was only slightly greater than ½-inch.

With reference to the FIGS. 9 through 19, a second, preferred embodiment of the collapsible video cassette of the invention is disclosed which can permit an even thinner profile. The plastic housing 102 has a lower panel 104, front wall 106, rear wall 108 and side walls 110. Side wings 122 and 123 pivot on hinges 124 from the lowered position shown in FIG. 9 to the raised position shown in FIG. 12. Hinges 124 may again be formed integrally as a unitary part of the plastic housing, by providing a flexible area of the plastic. Wings 122 and 123 have side walls 126 and 127 and top panels 128 and 129. Cylindrical posts 132 are provided on wings 122 and 123. As in the previous embodiment, they have pin extensions 131 which fit into holes 133 in posts 134 to form a full height post when the wings are pivoted to the raised position to align and secure the wings, posts 132 preferably being larger in diameter than posts 134, and posts 132 and 134 having rounded ends. L-shaped elements 135 are secured to the wings 122, 123 and have an upper flat surface 136. L-shaped elements 137 are secured to the lower panel 104 and side panels 110 of case 102 and have an upper flat surface 138. Double-sided adhesive elements 139 are provided to engage surfaces 136 and 138 respectively to secure the wings in the raised position.

Tape spools 150 and 152 are of a size to receive standard VHS ½-inch tape. Each has a lower flange 154 and a central post 156. The underside of each central post 156 is configured to receive the tape driving mechanism of the standard VHS recorder through apertures 160 in the lower panel 104 of housing 102.

Figure 20:
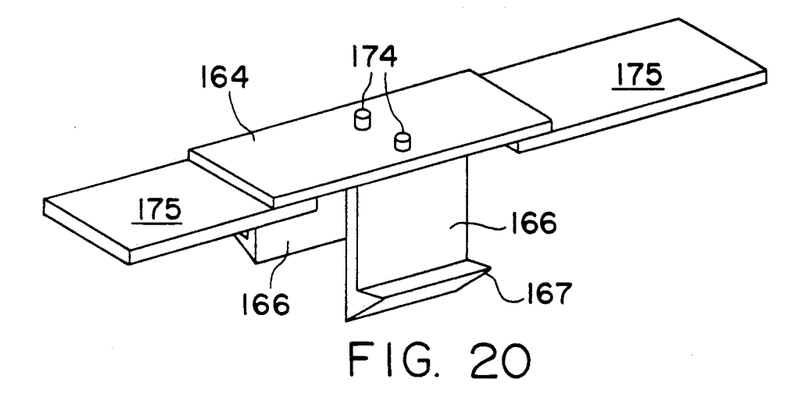
FIG. 20 is a perspective view of the spring-carrying frame of the invention.
Figure 21:
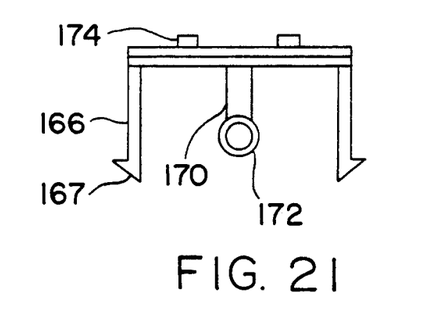
FIG. 21 is an end view of the frame shown in FIG. 20.

Central frame 164 has two legs 166, each provided with a clip 167, which slide in slots 169 of guide 168. Secured to the underside of frame 164 by flange 170 is a cylindrical tube 172 (FIG. 20). Two double-sided adhesive elements 173 are secured to the upper surfaces 175 of frame 164 to attach the cardboard top. Two knobs 174 are again provided on the upper surface of frame 164. A metal leaf spring 176 has a central rectangular area which is secured to the upper surface of frame 164, with holes 180 inserted over knobs 174 for alignment purposes. Knobs 174 are melt tabs which are melted into a mushroom shape to secure the spring in place, or the spring may be secured to frame 164 by glue. Spring 176 has two arms 182, the ends of which bear against the central posts 156 of the tape spools 150, 152. A top cover 190, typically of cardboard, is secured to the adhesive elements 173. Pivotally attached to the top cover 190 is a front door panel 192, held in place by hinge elements 194 which pivot against tabs 195. Cardboard pieces 196 provide a step down to keep the door panel flush with the top.

Figure 10:
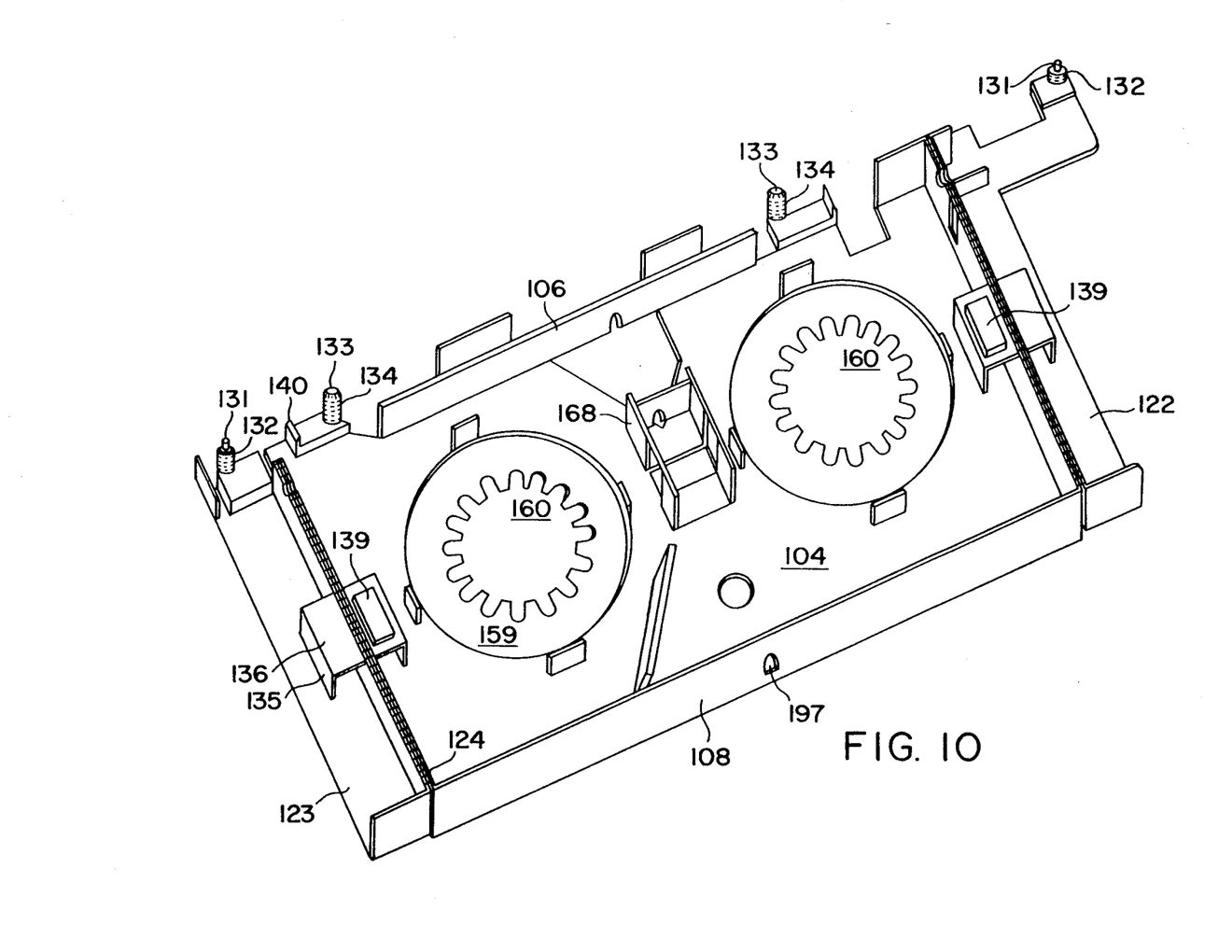
FIG. 10 is a perspective view of the casing of the embodiment of the invention shown in FIG. 9 in mailing position, with the tape spools and top cover removed for illustrative purposes.
Figure 17:
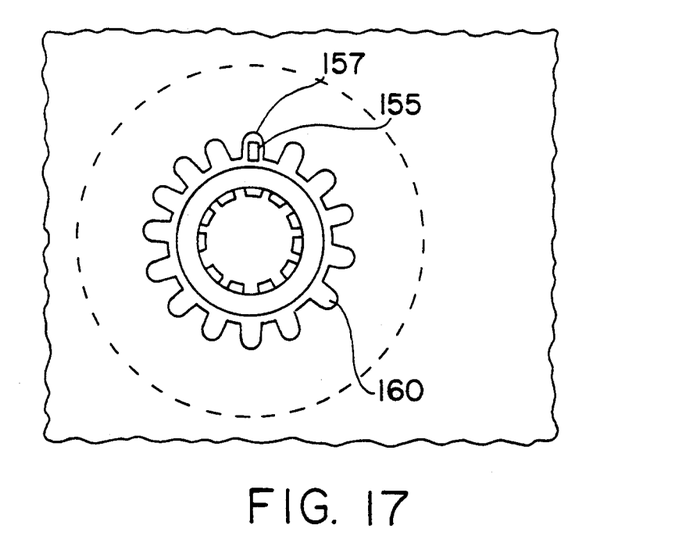
FIG. 17 is a bottom view of the video cassette of the invention, showing the tape reel in place.

As shown in FIGS. 10 and 17, apertures 160 have a serrated circumference and a recess 159 in bottom panel 104 is provided to receive flanges 154. The underside of the flange 154 of tape spools 150, 152 has a locking nub 155 which sits in one of the serrations 157 to prevent the spool from rotating when the cassette is in the lowered mailing position. When the cassette is in the operating position and is loaded in the VCR, the drive gears of the VCR engage teeth 161 and lift the spools 150, 152 which causes the locking nubs 155 to rise out of the serration 157 to permit rotation of the tape spool.

Figure 11:
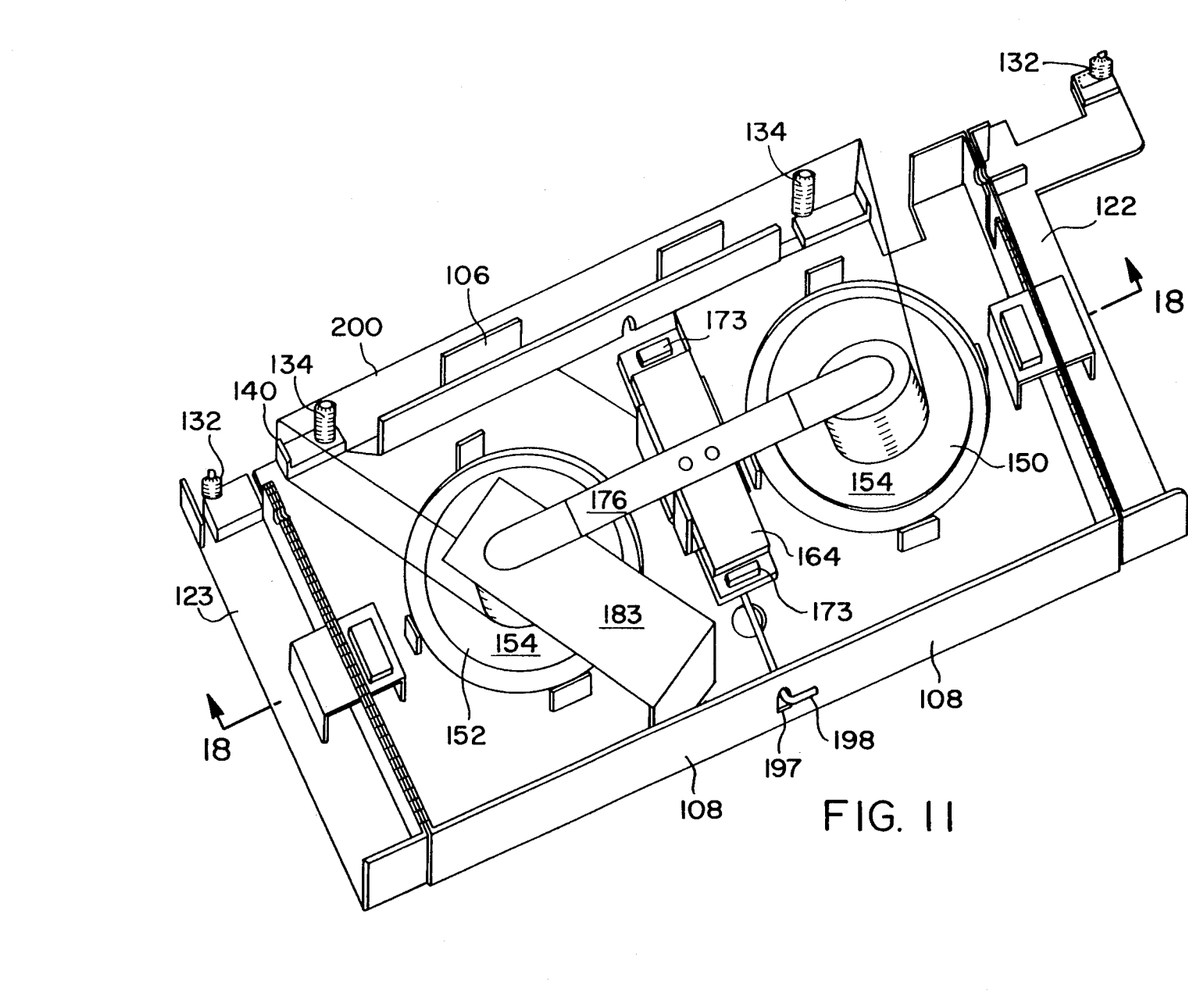
FIG. 11 is a perspective view of the video cassette of FIG. 9 showing the tape reels and central frame assembly in place and the tape in mailing position.
Figure 18:
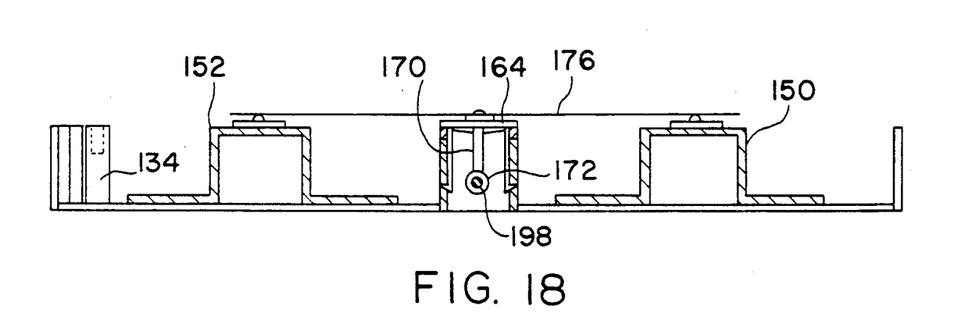
FIG. 18 is a cross-sectional view of the video cassette of the invention taken along lines 18—18 of FIG. 11 with the wings not shown.

The cassette of the invention is shown in FIGS. 11 and 18 in orientation for mailing. Wings 122 and 123 are folded downwardly to reduce the thickness of the cassette. Frame 164 is moved downwardly, and attached spring 176 placed under tension, until hole 197 in rear wall 108 of housing 102 is aligned with tube 172. Pin 198 is then inserted through hole 197 (there is a corresponding hole 187 in the top 190—see FIG. 13) and tube 172 to secure the frame 164 in the lowered position for mailing. The videotape 200 is held around tabs 140 which permits the tape to sit lower in the housing than it does in operation when it slides around pins 134. Tabs 140 are of such height that when the cassette is inserted in a VCR and spools 150, 152 rise upwardly, winding of the tape will cause the tape to slip over the tabs to slide against posts 132/134.

Figure 12:
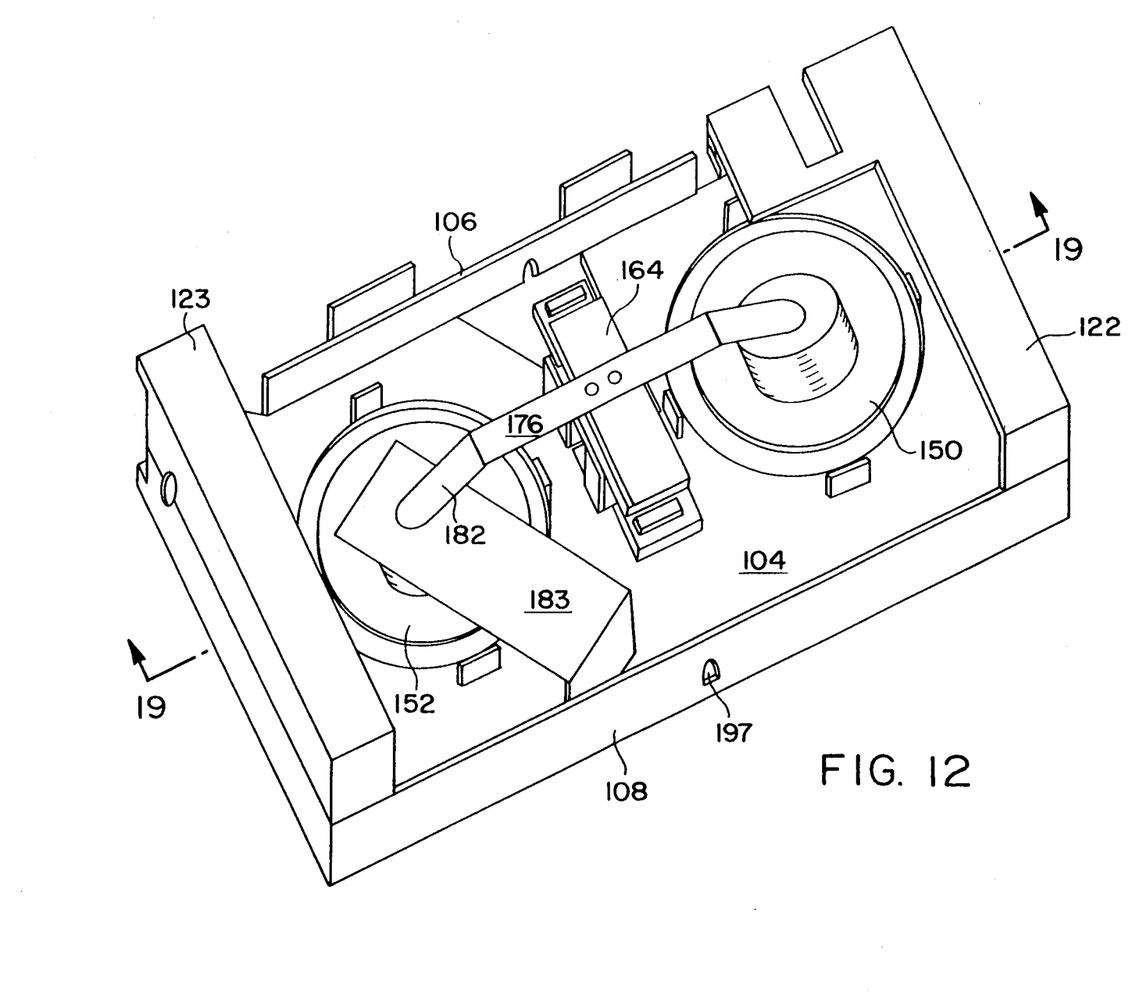
FIG. 12 is a perspective view of the video cassette of FIG. 9 in operating position with the top removed for illustration.
Figure 13:
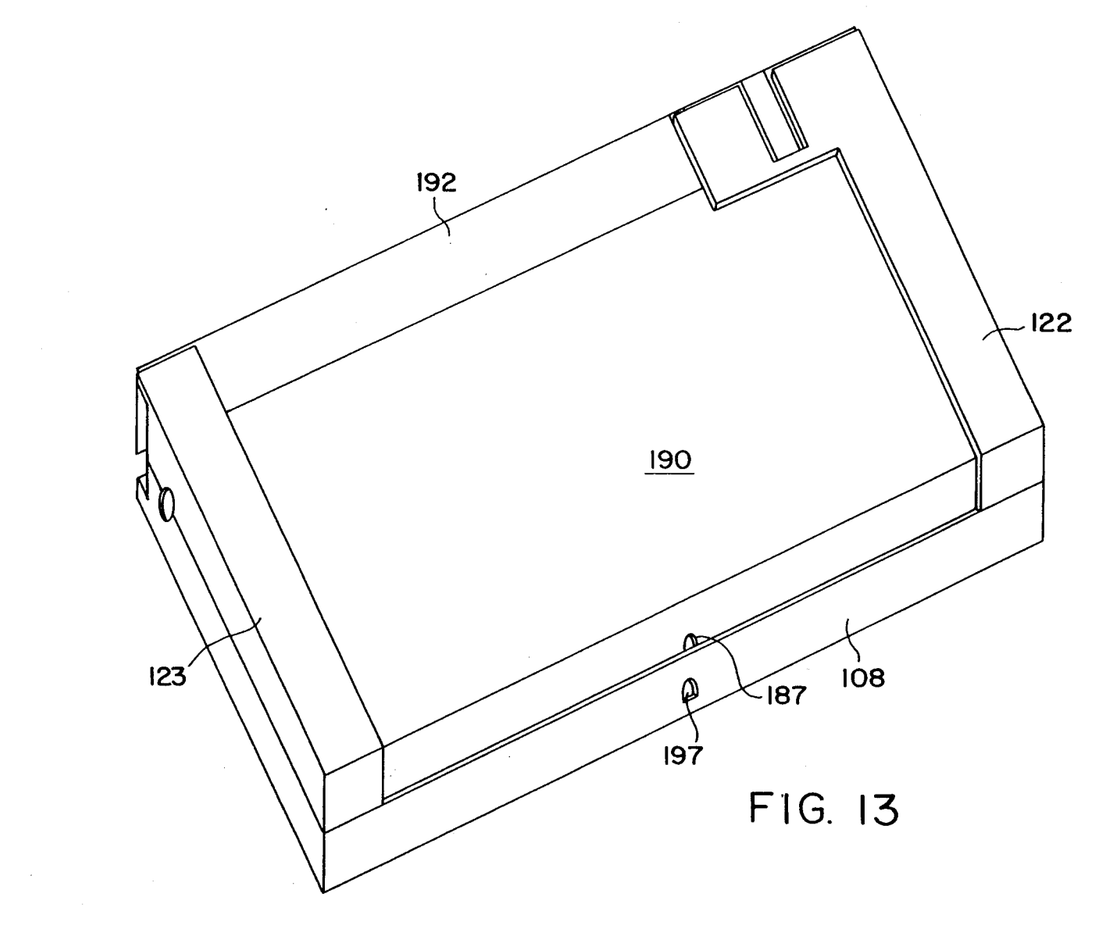
FIG. 13 is a perspective view of the video cassette of FIG. 11 with the top in place.
Figure 14:
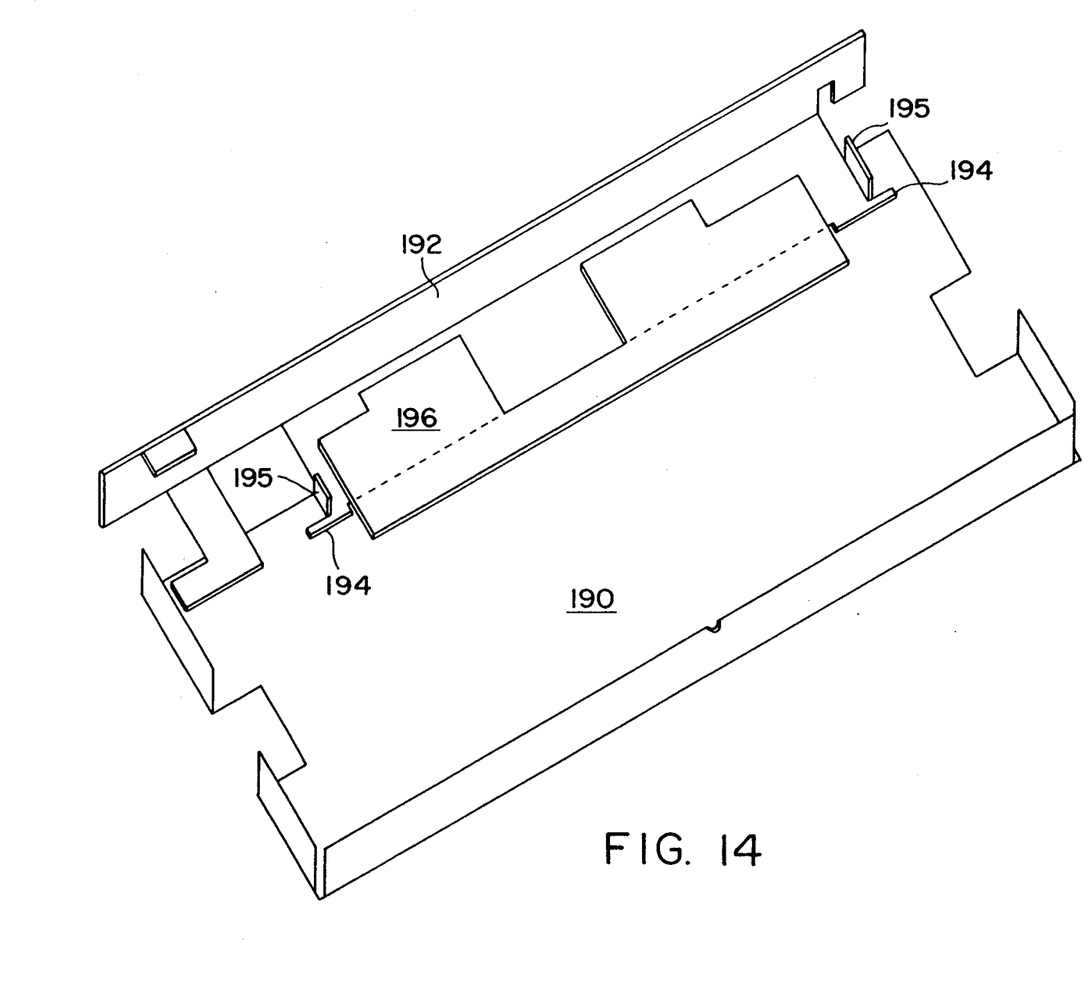
FIG. 14 is a perspective view from beneath of the top of the cassette of the invention and the door panel.
Figure 15:
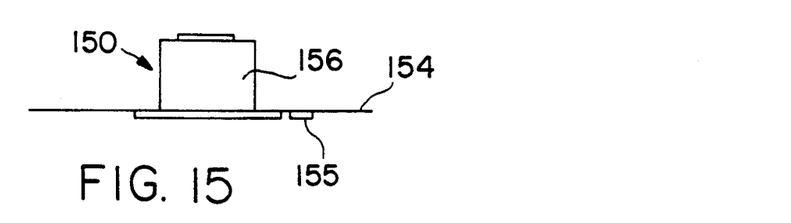
FIG. 15 is a side view of the tape reel of the invention.
Figure 16:
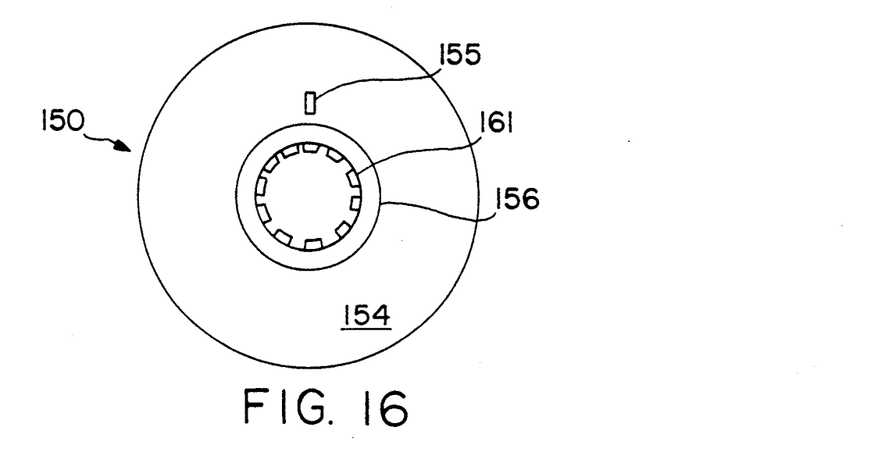
FIG. 16 is a bottom view of the tape reel of FIG. 15.
Figure 19:
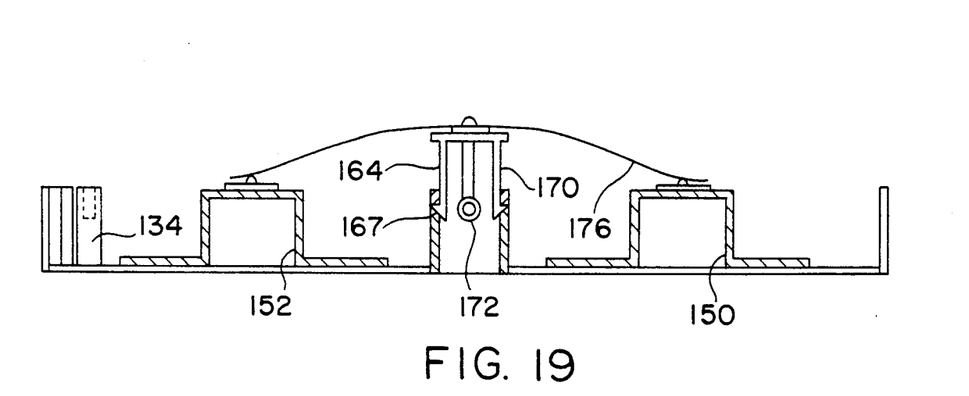
FIG. 19 is a cross-sectional view of the video cassette of the invention taken along lines 19—19 of FIG. 12 with wings not shown.

To place the cassette in the operating position, wings 122 and 123 are pivoted to the upper position secured by adhesive strips 137. Pin 198 is removed as shown in FIGS. 12 and 19, and spring 176 causes frame 164 to move upwardly to its upper position shown in FIG. 19. Cover 190 rides upwardly on spring 176 and sits under wings 122 and 123 when these are pivoted to the upper position. Upon insertion into a VCR, spools 150, 152 are lifted upwardly out of recesses 159, releasing locking nub 155. The reels are then free to rotate. The VCR will automatically advance the tape beyond the clear leader, causing tape 200 to slip over tabs 140 to ride on pins 132/134. In this way the cassette can now function at its full 1-inch thickness in a standard VHS VCR while its mailing thickness was only slightly greater than ½-inch. Flange 183 bears down on the top edge of the tape as it winds onto the take-up spool to smooth the wind of the tape as it winds beneath it.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A video cassette wherein said cassette comprises a housing having top and bottom surfaces lying in parallel planes and front, rear and side walls perpendicular to said top and bottom surfaces, said housing enclosing two video tape spools mounted for rotation about parallel axes perpendicular to the plane of said bottom surface, each said spool having upper and lower surfaces, said lower surface of each spool lying adjacent said plane of said bottom surface of said cassette, wherein said top surface of said cassette is movable between a lower position above and closely adjacent to said upper surface of said spool whereby said spools are retained in place within said housing and an upper operating position above said lower position wherein said cassette is adapted for operation in a standard video cassette recorder, and wherein said housing comprises L-shaped pivoting wings pivotally connected along a first side of each said wing to said side walls, said wings being pivotable between a first position wherein said first side is in a parallel plane to said side walls of said housing and said operating position wherein each said first side is co-planar with a respective side wall.

2. The video cassette of claim 1 wherein a section of said top surface is secured to a movable frame.

3. The video cassette of claim 1 wherein said section of said top surface is biassed to said upper position.

4. The video cassette of claim 3 wherein said section of said top surface is biassed to upper position by a biassing means bearing against said upper surface of one of said spools.

5. The video cassette of claim 4 wherein said biassing means bears against said upper surface of said spools and further comprising friction reducing means interposed between said biassing means and said tape spools.

6. The video cassette of claim 4 wherein said biassing means bears tightly against the upper surface of said tape spools when said top surface is in said lowered position to prevent movement of said spools.

7. The video cassette of claim 1 wherein said cassette comprises means for releasably holding said top surface in said lower position.

8. The video cassette of claim 7 wherein said means for releasably holding said top surface in said lower position comprises elongated pin means removably received in an aperture in said movable frame.

9. The video cassette of claim 1 further comprising a post extending between said planes of said top and bottom surfaces of said housing and positioned to direct said tape between said spools when said cassette is in said operating position.

10. The video cassette of claim 9 wherein said post comprises two coaxial, colinear cylinders, the first cylinder having a diameter greater than the second cylinder.

11. The video cassette of claim 9 comprising two said posts.

12. The video cassette of claim 1 further comprising two posts extending between said planes of said top and bottom surfaces of said housing and positioned to direct said tape between said spools when said cassette is in said operating position, wherein each said post comprises two coaxial, collinear cylinders, the first cylinder having a diameter greater than the second cylinder, one of said cylinders being secured to said wing and the second cylinder being secured to said lower surface of said housing.

13. A video cassette wherein said cassette comprises a housing having top and bottom surfaces lying in parallel planes and front, rear and side walls perpendicular to said top and bottom surfaces, said housing enclosing two video tape spools mounted for rotation about parallel axes perpendicular to the plane of said bottom surface, each said spool having upper and lower surfaces, said lower surface of each spool lying adjacent said plane of said bottom surface of said cassette, wherein said top surface of said cassette is movable between a lower position above and closely adjacent to said upper surface of said spool whereby said spools are retained in place within said housing and an upper operating position above said lower position wherein said cassette is adapted for operation in a standard video cassette recorder, wherein said section of said top surface is biassed to said upper position by a biassing means bearing against said upper surface of one of said spools, and wherein said spools are recessed relative to said lower surface in said lower position.

14. The video cassette of claim 13 further comprising videotape secured to and wound on said tape spools and wherein said videotape is held in a first, lower position against tab means for retaining said videotape in said lower position, and a section of said videotape is adapted to be lifted over said tab means to a second, raised position in said operating position.

15. A video cassette wherein said cassette comprises a housing having top and bottom surfaces lying in parallel planes and front, rear and side walls perpendicular to said top and bottom surfaces, said housing enclosing two video tape spools mounted for rotation about parallel axes perpendicular to the plane of said bottom surface, wherein said top surface of said cassette is movable between a lower position wherein said spools are retained substantially immobile, and an upper operating position in a plane above said lower position wherein said cassette is adapted for operation in a standard video cassette recorder further comprising L-shaped pivoting wings pivotally connected along a first side of each said wing to said side walls, said wings being pivotable between a first position wherein said first side is in a parallel plane to said side walls of said housing and said operating position wherein each said first side is co-planar with a respective side wall.

* * * * *